(12) United States Patent
Rekimoto

(10) Patent No.: US 6,738,973 B1
(45) Date of Patent: May 18, 2004

(54) ACCESS-HISTORY INDICATING METHOD AND APPARATUS, RESOURCES PROVIDING METHOD AND APPARATUS, AND PROGRAM PROVIDING MEDIUM USED THEREWITH

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 616 days.

(21) Appl. No.: 09/634,371

(22) Filed: Aug. 9, 2000

(30) Foreign Application Priority Data

Aug. 10, 1999 (JP) .......................................... P11-226047

(51) Int. Cl.[7] .............................. G06F 9/00; G06F 3/00
(52) U.S. Cl. ....................... 718/104; 708/201; 708/203; 708/218; 345/776; 345/854
(58) Field of Search ................................ 709/100, 101, 709/102, 103, 104, 223, 218; 345/776, 835; 707/202; 718/218, 220, 221, 223

(56) References Cited

U.S. PATENT DOCUMENTS

| | | | | |
|---|---|---|---|---|
| 5,119,493 A | * | 6/1992 | Janis et al. ................. | 709/101 |
| 5,155,850 A | * | 10/1992 | Janis et al. ................. | 707/202 |
| 6,078,324 A | * | 6/2000 | Phathayakorn et al. ..... | 345/835 |
| 6,310,630 B1 | * | 10/2001 | Kulkarni et al. ............ | 345/776 |
| 6,457,025 B2 | * | 9/2002 | Judson ..................... | 715/501.1 |
| 6,526,397 B2 | * | 2/2003 | Chee et al. ................. | 707/1 |

* cited by examiner

Primary Examiner—Majid A. Banankhah
(74) Attorney, Agent, or Firm—Bell Boyd & Lloyd LLC

(57) ABSTRACT

An access-history indicating method sequentially records a history of access by a user to a resource object such as a file or a WWW page. In the method, an access history icon that visually represents access-history information is generated and is displayed in the vicinity of the corresponding icon on a desktop screen or in the vicinity of an anchor of a WWW page. The access history icon has an image in which events of accessing the corresponding resource object are displayed on a time base. The image may be displayed by separating the type of access into modification and reference. The user can obtain a visual and intuitive understanding about a history of access to each file and a history of updating each file. The obtained information can be used as an important key for selecting among files and WWW pages.

32 Claims, 10 Drawing Sheets

| | | | |
|---|---|---|---|
| ▪▪=▪ | 46001405 | cdid | MIDORI/paganini vn con |
| ▪▪=▪ | 000000000000 | | sample |
| ▪▪=▪ | 02894570752 | | CD:Brahms Vn.Con.Mutt |
| | 07675 | | PC WAVE |
| ▪▪=▪ | 21104 | | WEEKLY ASCII |
| | 03595 | | MONTHLY ASCII |
| ▪▪=▪ | 9784756130174 | isbn | Java3D API-ADAPTED |
| | 00000 | | BULLETIN OF Real World BBS AS IT IS |

ACCESS-HISTORY INDICATING METHOD AND APPARATUS, RESOURCES PROVIDING METHOD AND APPARATUS, AND PROGRAM PROVIDING MEDIUM USED THEREWITH

BACKGROUND OF THE INVENTION

1. Field of the Invention

The present invention relates to technology for managing various types of resource objects treated in computer systems, and in particular, to a technology for managing the state of access to each resource object by a user. Specifically, the present invention relates to an access-state managing technology for enabling the user to visually recognize the state of user's access to each resource object on the desktop screen of the computer, and more specifically to an access-state management technology for enabling the user to visually recognize the states of referring to and updating of each resource object by the user. In this Specification, the word "access" includes the meanings of the words "reference" and "modification".

2. Description of the Related Art

With recent rapid progress in the field of information technology, various general-purpose computer systems such as workstations and personal computers have been developed and produced, and have come into wide use in company offices, ordinary homes, and research organizations like universities.

In this type of computer system, in addition to text-format document files, various resource objects such as sounds and images are digitized and converted into predetermined file formats, whereby the resource objects can be uniformly treated.

In most cases, recent general-purpose computer systems have a bitmap display function (i.e., the function of rendering a display image in units of pixels) as a result of an increase in processor performance and an enhanced video subsystem. Also, it is commonly known to build into an operating system (OS) a graphical user interface (GUI) of a graphic-based type instead of a character-based DOS screen, that is, a character user interface (CUI), which supports a bitmap display format.

Under the GUI environment, desktop images simulating the computer system and a plurality of icons are displayed on a display screen.

The word "desktop" means a screen on which the user performs operations, and means a background on which display objects such as icons and windows are positioned.

Each "icon" is a small image indicating a resource object usable in the computer system, and is displayed on the desktop or in a window on the desktop. The icons are symbols embodying resource objects on the desktop, such as applications, disk drives, folders (directories), and files.

Each "window" is a frame displayed on the desktop in order to display resource objects. Windows are standardized in the computer industry, and basically consist of a window title bar and window borders. The title bar is a section for displaying the title of a corresponding window. The title enables identification of information displayed in the present window, that is, a resource object entity.

On the desktop provided by the above-described GUI, all the resource objects treated in the computer system are represented as icons. Processes on each resource object are embodied by intuitive operations using a mouse, such as clicking, dragging, and dropping.

By way of example, on a desktop screen provided by an OS such as Windows 95/98, or in the "Explorer" window opened on this desktop, icons symbolizing processible files and folders, and applications are displayed.

With recent improvements in information communications technology, "network computing" has rapidly come into wide use. In network computing, by using a network to link together a plurality of computer systems, resource objects possessed by each computer system, such as files, can be efficiently and flexibly managed. In other words, on the network, operations such as sharing and transferring a file among the systems are easily realized.

The "network" means a communications network for transferring data between computers, and there are various types from a local area network (LAN) to the Internet, which is a large worldwide network formed by linking servers together. In particular, the use of the Internet is rapidly increasing, and there is remarkable progress in the development of Internet-related technology.

On the Internet, various resource-providing services or the World Wide Web (WWW) are open to the public. The WWW is a wide-area information retrieving service that provides a resource space having a hyperlink structure formed by links among resource objects described in the Hypertext Markup Language (HTML) format. The WWW consists of WWW servers that provide resource objects and WWW clients that request provision of the resource objects. Between each server and its client, resource accessing is performed in accordance with the HyperText Transfer Protocol (HTTP), as is widely known.

Each WWW server actually includes a general-purpose computer system that executes server applications. Each WWW client actually includes a general-purpose computer system in which a "user agent" (called a "WWW browser") performing resource accessing instead of the user is activated.

Each resource object in the WWW resource space is specified by a unique object identifier described in a form called a "uniform resource locator (URL)". At the WWW client, by using keys to input the character string of a URL designating the desired resource into the location box of the WWW browser screen, accessing of the resource object is requested. Also, by using a user interface operation such as using a mouse to click an anchor in which the URL of a link destination in a WWW page is embedded, accessing of the resource object can be requested. In other words, the WWW browser is provided with an advanced GUI, and the user can freely browse a plurality of WWW pages, just by only an intuitive operation such as clicking the anchor, as is widely known.

The anchor on the WWW page screen is, for example, a character string or icon displayed in the form of a hot spot.

In the world of computers and the Internet, data on a frequency that each resource object is used, such as an access history, is an important key for managing the resource space. The access history is varying time-series data.

For example, data or files having a low frequency of use imply that they have low value and low importance, and there may be a case where they are useless and only consume storage space on a hard disk. When a file having a large storage size, such as graphical data and a large application, has a low frequency of use, an excessive load is imposed on the hard disk. In addition, among files shared via a network, files which have been used a small number of times imply that the files are unnecessary since persons who share the files have small interest in the files. Files having a low frequency of use are not worth accessing, and they can be compressed, archived, or abandoned.

Conversely, data and files having a high frequency of use imply that they have a high value and high importance. Among the files shared via the network, files which have been accessed a large number of times imply that contents stored in the files are meaningful, and this implication can be used as a key for other users to retrieve information. If the data and files having a high frequency of use are archived or abandoned, an excessive recovery effort is required.

By way of example, when a resource object is a "document" or a "book" in the real world, its use naturally leaves marks of having been used, and the marks indicate the frequency of use. A useful book that is often referred to is "dirty", and pages that are often opened have marks by being folded. These marks are important keys for selecting among documents and books.

Even when a resource object is a virtual "document" file existing in the world of computers, an access history is an important key for selecting among documents.

On this type of virtual document file, marks of use are usually not left. For example, on the desktop screen provided by an OS such as Windows 95/98, new files, old files, frequently updated files, and files that are only referred to without being updated are displayed as uniform icons. The images of the icons differ from one another. This enables each file to be identified (i.e., each icon itself a substitute of each file), and the state of access to each file. In short, on the desktop screen, the state of access to each file cannot be recognized at a glance.

On the WWW browser screen, resource objects provided in the WWW resource space, in other words, a WWW page, is displayed, and information of a link to another WWW page appears in the form of an anchor, as described above. This anchor is displayed in the form of a hot spot so as to be distinguished from other display objects including no link information. In addition, by displaying an anchor that has been once traced in a color different from the colors of other anchors, visual recognizability of the access history is enhanced.

By considering the above-described color differentiation of the anchors, the WWW user can visually recognize, to some extent, new WWW pages and frequently accessed WWW pages. Nevertheless, other WWW users who exist in the WWW resource space cannot use the anchor color differentiation since the anchor color differentiation is dependent on data recorded on a local file of the WWW user. Also, in the present circumstances, more detailed information, such as the recent frequency that a specific WWW page has been accessed and updated, is almost never provided.

Some WWW pages have an access counter, as is generally known. The access counter is incremented by one whenever the WWW page is accessed. Seeing the value of the access counter enables, to some extent, a grasp of the state of access to the WWW page. However, a management method using the access counter has the following problems.

(1) The counter value is a cumulative number of times accessing is performed, which is reckoned from a specific date, and access patterns (access frequencies by day, time, etc.) cannot be indicated.

(2) Each WWW page has a count start date. Simply seeing the counter value cannot allow a user to grasp an actual number of times accessing is performed. In other words, the user cannot have an intuitive understanding at a glance since the user must take the date for reckoning into consideration.

(3) The access counter is included in the WWW page. Before accessing the WWW page, that is, tracing a link, the user cannot recognize the counter value. Accordingly, WWW navigation cannot be provided in which, from among a plurality of links, the one which has been recently updated often is first traced.

In the Internet industry, when a new anchor is added to the WWW page, it is the custom to provide the anchor with an icon indicating "new" (hereinafter referred to as a "new icon") or the like. In this case, a time reference to show when the anchor was "new" is unclear (the reference differs depending on determination by each WWW creator), and there is a slight lack of reliability. Also, when it is necessary to know not the updating of the WWW page but an access frequency, the "new" icon is useless.

SUMMARY OF THE INVENTION

Accordingly, in view of the foregoing problems, it is an object of the present invention to provide an access-state management technology in which the state of access to each resource object by a user is easily and intuitively visually recognized on the desktop screen of a computer.

In addition, it is another object of the present invention to provide an access-state management technology in which the state of referring to each resource object by a user and the state of updating each resource object, which are set to be separate, are easily and intuitively visually recognized on the desktop screen of a computer.

To these ends, according to a first aspect of the present invention, the foregoing objects are achieved through provision of an access-history indicating method for indicating a history of access to a resource object on a computer screen. The access-history indicating method includes the steps of (a) sequentially recording the history of access to the resource object, (b) generating an access history icon time-sequentially representing the history of access to the resource object, and (c) displaying, on the computer screen, the generated history information so as to be correlated with the icon of the resource object.

Preferably, the access history icon consists of a time base and a mark representing each record of access which is disposed at the corresponding position on the time base.

The access history icon may be formed by determining whether each record of access to the resource object represents a reference to the resource object or modification of the resource object, and disposing a reference history mark and/or a modification history mark at each corresponding position on a time base.

The access-history indicating method may further include the step of executing, when one modification history mark in the access history icon is selected by a user, provision of a resource object entity corresponding to the selected modification history mark.

At least one of the steps (b) and (c) may be activated when a representation of a user's interest enters an area for displaying the icon of one resource object displayed on the computer screen.

The user's interest may be measured in accordance with the position of a displayed cursor movable on the computer screen by operating a mouse.

At least one of the steps (b) and (c) may be activated when the icon of the resource object is displayed on the computer screen.

The resource object may be a file in a predetermined format processible in a computer.

According to a second aspect of the present invention, the foregoing object is achieved through provision of an access-history indicating apparatus for indicating a history of access to a resource object on a computer screen. The access-history indicating apparatus includes (a) a means for sequentially recording the history of access to the resource object, (b) a means for generating an access history icon time-sequentially representing the history of access to the resource object, and (c) a means for displaying, on the computer screen, the generated history information so as to be correlated with the icon of the resource object.

Preferably, the access history icon consists of a time base and a mark representing each record of access which is disposed at the corresponding position on the time base.

The access history icon may be formed by determining whether each record of access to the resource object represents a reference to the resource object or modification of the resource object, and disposing a reference history mark and/or a modification history mark at each corresponding position on a time base.

The access-history indicating apparatus may further include a means for executing, when one modification history mark in the access history icon is selected by a user, provision of a resource object entity corresponding to the selected modification history mark.

At least one of the means (b) and (c) may be activated when a representation of a user's interest enters an area for displaying the icon of one resource object displayed on the computer screen.

The user's interest may be measured in accordance with the position of a displayed cursor movable on the computer screen by operating a mouse.

At least one of the means (b) and (c) may be activated when the icon of the resource object is displayed on the computer screen.

The resource object may be a file in a predetermined format processible in a computer.

According to a third aspect of the present invention, the foregoing objects are achieved through provision of a resource providing method for providing a resource object including reference information for referring to another resource object. The resource providing method includes the steps of (a) sequentially recording a history of access to the resource object, (b) generating a command for displaying an access history icon time-sequentially representing the history of access to the resource object, and (c) adding the command generated in the step (b) to the reference information.

Preferably, the access history icon consists of a time base and a mark representing each record of access which is disposed at the corresponding position on the time base.

The access history icon may be formed by determining whether each record of access to the resource object represents a reference to the resource object or modification of the resource object, and disposing a reference history mark and/or a modification history mark at each corresponding position on a time base.

The command generated in the step (b) may prescribe that, when a user's interest enters a piece of reference information on a computer screen displaying resource objects, an access history icon corresponding to a resource object to be referred to by the piece of reference information is displayed.

The command generated in the step (b) may prescribe that, when the reference information is displayed on a computer screen, an access history icon corresponding to a resource object to be referred to by the piece of reference information is displayed.

At least one of the steps (b) and (c) may be activated when provision of the resource object is requested.

Each of the resource objects may be a document file described in a markup description language, and the command generated in the step (b) may be a script described in a script language.

According to a fourth aspect of the present invention, the foregoing objects are achieved through provision of a resource providing apparatus for providing a resource object including information for referring to another resource object. The resource providing apparatus includes a recording means for sequentially recording a history of access to the resource object, a generating means for generating a command for displaying an access history icon time-sequentially representing the history of access to the resource object, and an adding means for adding the command generated by the generating means to the reference information.

Preferably, the access history icon consists of a time base and a mark representing each record of access which is disposed at the corresponding position on the time base.

The access history icon may be formed by determining whether each record of access to the resource object represents a reference to the resource object or modification of the resource object, and disposing a reference history mark and/or a modification history mark at each corresponding position on a time base.

The command generated by the generating means may prescribe that, when a user's interest enters a piece of reference information on a computer screen displaying resource objects, an access history icon corresponding to a resource object to be referred to by the piece of reference information is displayed.

The command generated by the generating means may prescribe that, when the reference information is displayed on a computer screen, an access history icon corresponding to a resource object to be referred to by the piece of reference information is displayed.

At least one of the generating means and the adding means may be activated when provision of the resource object is requested.

Each of the resource objects may be a document file described in a markup description language, and the command generated by the generating means may be a script described in a script language.

According to a fifth aspect of the present invention, the foregoing objects are achieved through provision of a program providing medium for providing, in a material and computer-readable form, a computer program for controlling a computer to execute a process for indicating a history of access to a resource object on a computer screen. The computer program includes the steps of (a) sequentially recording the history of access to the resource object, (b) generating a command for displaying an access history icon time-sequentially representing the history of access to the resource object, and (c) displaying the generated access history icon on the computer screen so as to be correlated with the icon of the resource object.

According to a sixth aspect of the present invention, the foregoing objects are achieved through provision of a program providing medium for providing, in a material and computer-readable form, a computer program for controlling a computer to execute a resource providing process for providing a resource object including reference information for referring to another resource object. The computer program includes the steps of (a) sequentially recording the history of access to the resource object, (b) generating a command for displaying an access history icon time-sequentially representing the history of access to the resource object, and (c) adding the command generated in the step (b) to the reference information.

According to the present invention, an access-state management technology can be provided in which the state of user's access to each resource object can be easily and intuitively visually recognized on a desktop screen of a computer.

The above-described program providing media are, for example, media that provide, in a material and computer-readable form, a computer program to multi-purpose computer systems that can execute various types of program codes. The above-described program providing media are particularly not limited to specific forms. Removable and portable storage media such as compact disks, floppy disks, and magneto-optical disks, and transmission media such as networks (by radio or wire, or by terrestrial waves or satellite waves), may be used as the above-described program providing media.

In the above-described program providing media, the coordinated relationship in structure and function between the computer program and the providing medium for realizing computer-program functions is defined. In other words, by using each of the above-described program providing medium to install a predetermined computer program in a computer system, coordinated operations are performed in the computer system, whereby operations and advantages similar to those in the other aspects of the present invention can be obtained.

According to the present invention, an access-state management technology can be provided in which the state of access to each resource object by a user and the state of updating each resource object, which are set to be separate, are easily and intuitively visually recognized on the desktop screen of a computer.

According to the present invention, a user of a computer can obtain a visual and intuitive understanding about a change pattern of an access frequency during a predetermined period in the past, such as a history of reference to each resource object and a history of updating, whereby the change pattern can be used as an important key for selecting among files and WWW pages.

Further objects, features and advantages of the present invention will become apparent from the following description of the preferred embodiments with reference to the attached drawings.

DESCRIPTION OF THE PREFERRED EMBODIMENTS

Embodiments of the present invention are described below with reference to the accompanying drawings.

A first embodiment of the present invention in which the present invention is applied to a stand-alone computer system is described with reference to FIG. 1.

Figure 1:
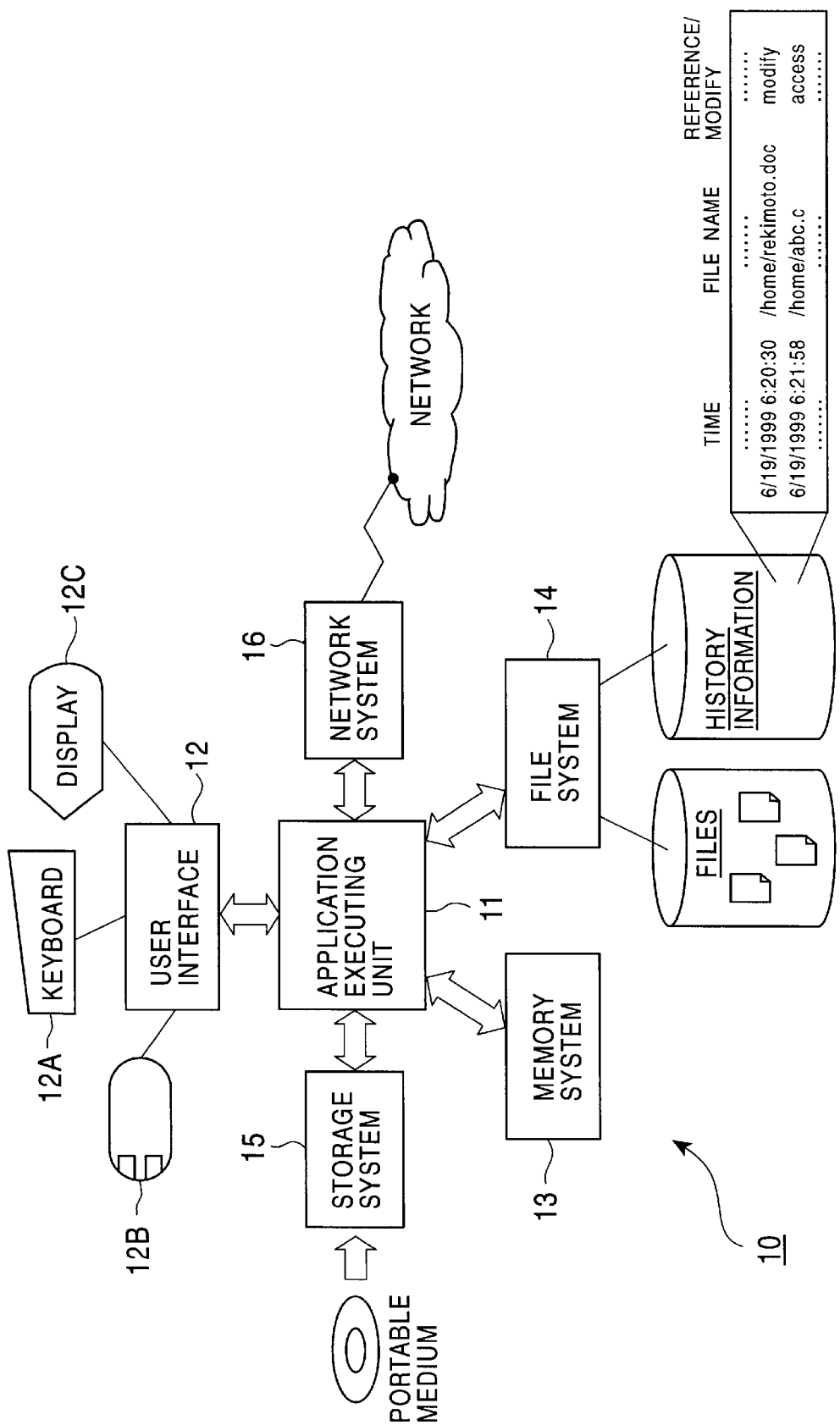
FIG. 1 is a block diagram showing a stand-alone computer system 10 which serves for realizing the present invention.

FIG. 1 uses a block diagram to show the structure of a stand-alone computer system 10. The computer system 10 includes an application executing unit 11, a user interface 12, a memory system 13, a file system 14, a storage system 15, and a network system 16. Each component unit is described below.

The application executing unit 11 is a functional module that executes application programs installed into the computer system 10 under operating environments provided by an OS. As the application programs, software products adapted for various business uses can be used, such as document editing, word processing, spread sheets, communications, and information retrieving. Data treated in each application program are stored as files having a predetermined format.

The user interface 12 processes characters input from a keyboard 12A or user commands input in the form of coordinate designation from a mouse 12B. The user interface 12 is a functional module for displaying a processing screen on a display 12C. As the display 12C, for example, a cathode-ray tube display or a liquid crystal display is used.

The user interface 12 in the first embodiment provides GUI environments, and displays a "desktop" simulating the computer system 10 on the screen of the display 12C. Resource objects on the computer system 10, such as the application programs executed by the application executing unit 11 and files treated by the application programs, are embodied as display objects such as "icons" and "windows" on the desktop screen.

A user uses the desktop screen as a workplace in which the mouse 12B is used. In other words, by performing intuitive operations such as clicking, and dragging and dropping each display object with a mouse cursor, the user can input commands.

The memory system 13 is a functional module for managing a memory space having several tens to several hundred megabytes. Specifically, the memory system 13 loads, into the memory space, a program code to be used by the application executing unit 11, and temporarily stores work data obtained while the program is being executed. The memory space is, for example, a volatile storage unit composed of a plurality of dynamic random access memories.

The memory system 14 is a functional module for managing a file space having several gigabytes to several tens gigabytes. In this file space, each application program to be executed by the application executing unit 11 is stored as an executable file. Resource objects such as data for use in each application program are also stored in the file space. Also codes or data whose frequency of use decreases is temporarily swapped out in the file space. The file space is a nonvolatile storage unit such as a hard disk drive, which is connected to the computer system 10 in accordance with a standard disk interface such as the Integrated Drive Electronics (IDE).

For preferably realizing the present invention, it is preferable that the file system 14 have the function of recording history information on a history of access to each resource object (i.e., each file) stored in the file space. The history information includes access times and access attributes (in other words, reference only or modification). In the example shown in FIG. 1, the fact that document "rekimoto.doc" in directory "home" was accessed for writing at 06:20:30 on Jun. 19, 1999, and the fact that file "abc.c" in directory "home" was accessed for reading at 06:21:56 on Jun. 19, 1999, are recorded as the access history information in the file space.

In most operating systems for general consumers, from Windows 95/98 of Microsoft Corporation in the U.S.A., a function of recording an access history is not actually standard on the file system. Accordingly, for practicing the present invention, a person who installs an OS must incorporate the function in the OS.

The storage system 15 is a functional module that accesses a portable recording medium other than a hard disk drive, in other words, reads or writes a file. The types of the portable medium include a CD-ROM, a digital versatile disk (DVD), a magneto-optical disk (MO), and a floppy disk (FD). A drive unit into which the portable medium is loaded and which drives the portable medium is connected to the computer system 10 in accordance with a standard interface such as the Small Computer System Interface (SCSI).

By using the above-described recording medium, the resource objects, that is, files such as programs and data can be moved (i.e., circulated or distributed) among a plurality of computer systems. For example, a computer program for realizing the present invention can be installed into the computer system 10 via the portable recording medium.

The network system 16 is a functional module for connecting the computer system 10 to a network. The network may be not only a LAN as a local and limited communications network but also a wide-area and open network such as the Internet.

The computer system 10 is linked to another computer system (not shown) (hereinafter referred to as a "remote system") on the network in accordance with a predetermined communications protocol such as the Transmission Control Protocol/Internet Protocol (TCP/IP). Between the computer system 10 and the remote system, information can be shared and circulated via the network. For example, by downloading a computer program for realizing the present invention from he remote computer, the computer program can be installed into the computer system 10.

The computer system 10 of this type is specifically a PC/AT-compatible of IBM in the U.S.A. or a successive machine in accordance with OADG (PC Open Architecture Developer's Group) specifications. In the machine, for example, Windows 95/98/NT of Microsoft Corporation is employed as an OS.

Next, management of the state of access to each file, realized in the computer system 10, is described below.

As described above, on the desktop screen, the resource objects such as files are displayed as "icons". The first embodiment has a function in which an "access management module" is activated in association with the displayed icons to generate, based on file-access-history information, icon images the visually represent the access histories and each access-history icon is positioned in the vicinity of the icon of the corresponding file.

Each access-history icon may be displayed so as to be pop-up when the mouse cursor is positioned on the related file icon, or may be always displayed while the related file icon is being displayed on the desktop.

The Access management module may be incorporated in another functional module such as the application executing unit 11 or the file system 14, or may exist as a separate functional module.

Figure 2:
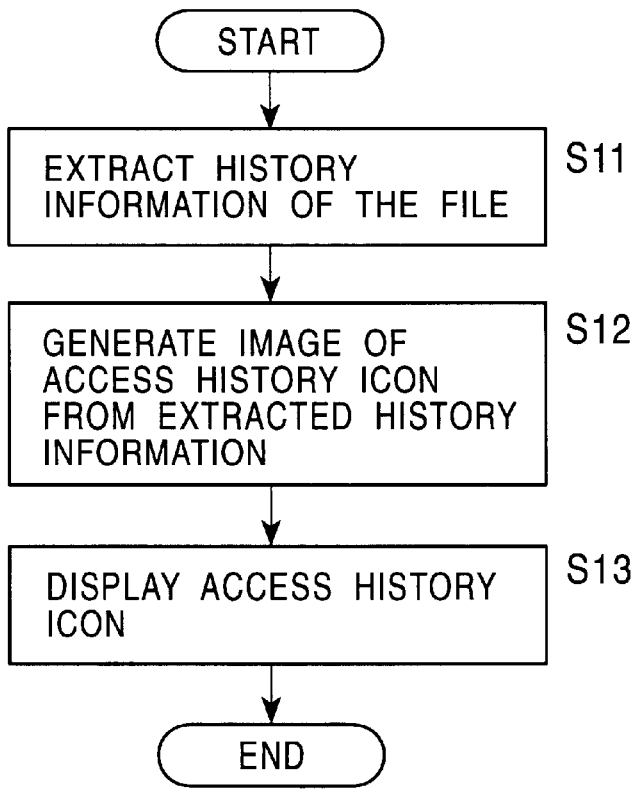
FIG. 2 is a flowchart showing a process executed by an access management module.

FIG. 2 illustrates a process executed by the access management module. The process is described below with reference to the flowchart shown in FIG. 2.

The access management module is activated in response to the generation of each of predetermined events on each file icon. The predetermined events include the emergence of a new file icon on the desktop and a disposition of the mouse cursor on a specified file icon.

The access management module initially searches for the history information managed by the file system 14, and extracts an access history about the desired file (step Sll).

Based on the extracted access history information, the access management module generates the image of an access history icon visually representing the access history (step S12).

Preferably, the access history icon has a form which time-sequentially represents a history of access to the file and which enables visual recognition of the contents of the access history, such as reference to and modification of the file, and a temporal change pattern of an access frequency.

Figure 3:
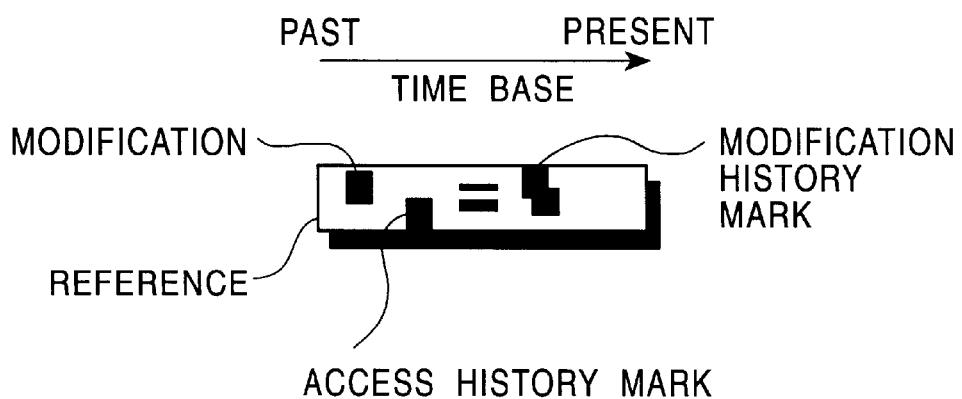
FIG. 3 is an illustration of the image of an access history icon for use in the present invention.

FIG. 3 shows the image of the access history icon in the first embodiment. As shown in FIG. 3, the access history icon is a rectangular image having a horizontal axis as a time base. The upper half of the access history icon from its time base is used to indicate a history of changes in the file, and the lower half is used to indicate a history of referring to the file. The access management module refers to the history information extracted from the file system, and puts a modification history mark at a position corresponding to each time the file is modified and/or a reference history mark at a position corresponding to each time the file is accessed.

The form of displaying the access history icon is not always limited to the image shown in FIG. 3, but may be any type of icon which indicates the access history along its time base and which enables visual recognition of temporal change patterns of the access history and the access frequency. For example, the vertical of the icon may be set as the time base, instead of the horizontal axis. The scale of the time base and a period in which the time is displayed on the icon are arbitrary and may be user-programmable.

After generating the above-described access history icon image, the access management module displays the icon image in the vicinity of the corresponding file icon on the desktop (step S13).

Concerning the form of displaying the access history icon, the access history icon may be displayed to be pop-up when the mouse cursor is positioned on a certain file icon on the desktop, and may be always displayed while each file icon is being displayed on the desktop.

Figure 4A:
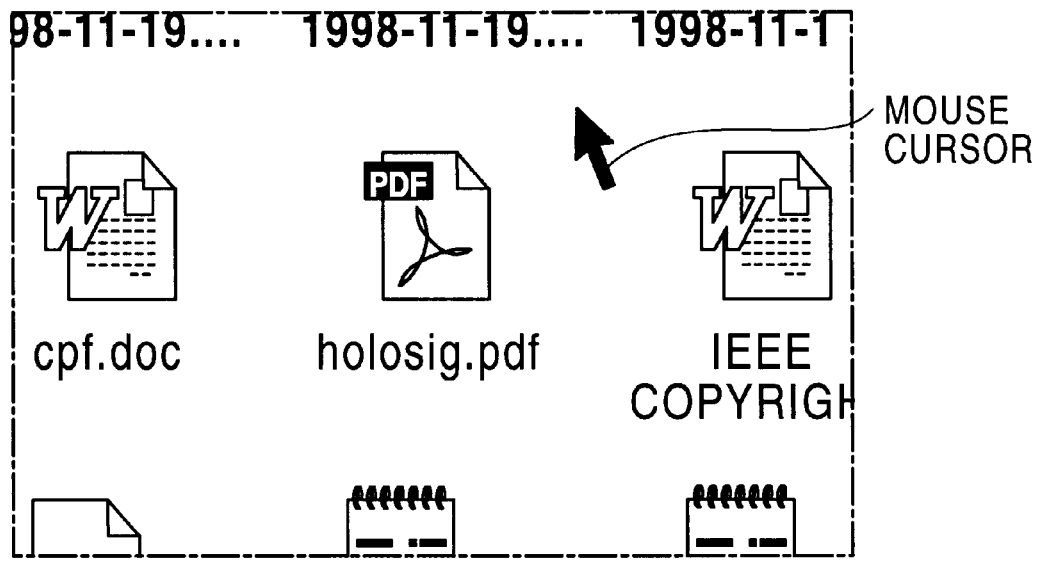
FIGS. 4A and 4B are drawings showing that, when a mouse cursor is positioned on a specific file icon, an access history icon is displayed so as to be pop-up.
Figure 4B:
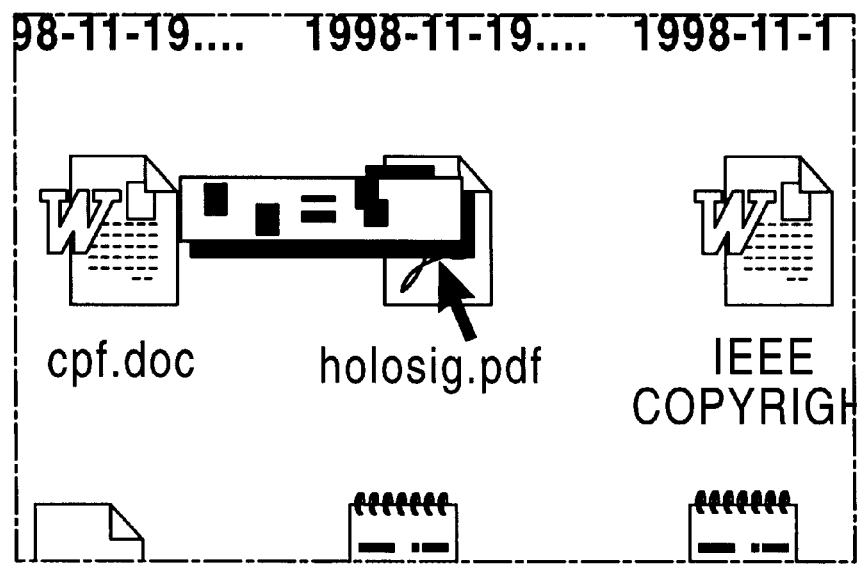

FIGS. 4A and 4B show that, when the mouse cursor is positioned on one file icon, a related access history icon is displayed to be pop-up.

When the user moves the mouse cursor on the desktop and the moved cursor enters an area for displaying the icon of predetermined file "holosig.pdf", the access management module is activated (see FIG. 4A). Then, an access history icon that describes an access history on the file appears in the vicinity of the file icon (see FIG. 4B).

Figure 5:
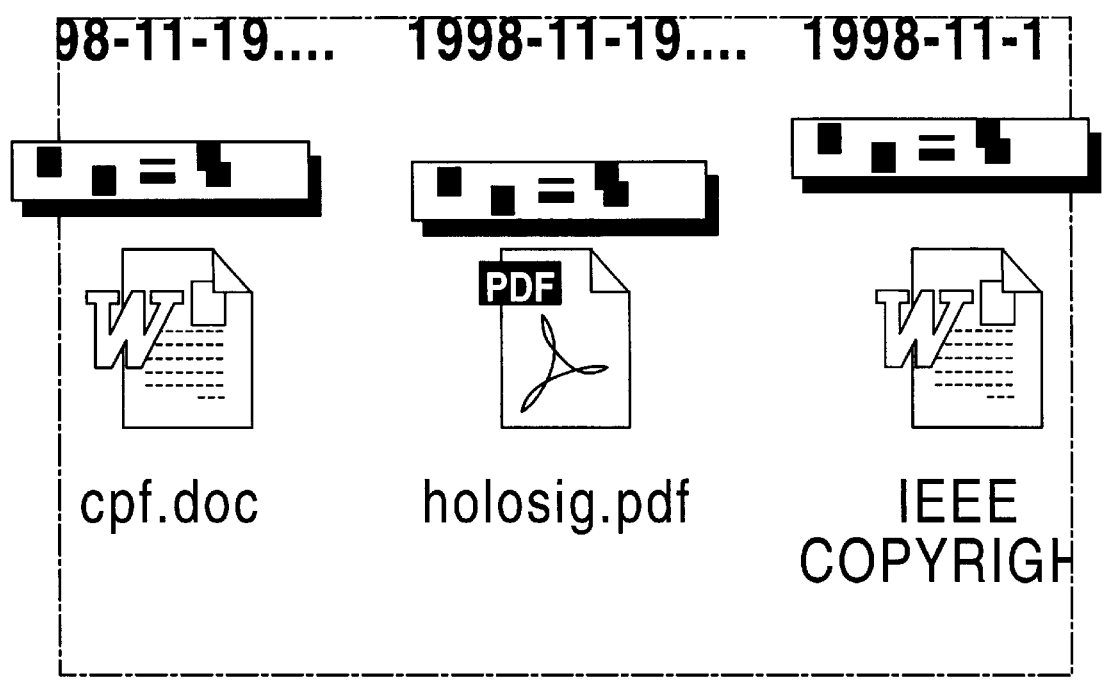
FIG. 5 is a drawing showing that access history icons are respectively displayed with the corresponding file icons on a desktop (or in an "Explorer" window in Windows 95/98)

FIG. 5 shows that access history icons are displayed with a plurality of file icons displayed on the desktop (or an "Explorer" window in Windows 95/98).

As in the case shown in FIGS. 4A and 4B, in the case where an access history icon is displayed to be pop-up only when being required, it may be displayed so as be superimposed on the file icon. Conversely, as in the case shown in FIG. 5, in the case where the access history icons are always displayed, it is preferable in visual recognition of the file icons to dispose the access history icons so as not cover the file icons.

In other words, according to the first embodiment, the user can not only visually recognize each file icon on the desktop screen, but also intuitively grasp access and modification histories of the file and their temporal change patterns at a glance. For example, by visually and easily obtaining file-related information such as the fact that "this file has been frequently referred to since a week ago", the information can be used as an effective key for file accessing.

In a modification of the access history icon in the first embodiment, by using the mouse cursor to search the rectangular display area of an access history icon, and clicking the desired modification history mark, a file modified corresponding to the date and time can be called. FIGS. 6A to 6D show a series of operations on the desktop screen which is related to the modification.

When the user moves the mouse cursor on the desktop screen to enter an area for the icon of predetermined "holosig.pdf", the access management module is activated. As a result, the access management module generates an access history icon related to the file, and displays the generated icon so as to be superimposed on the file icon (see FIG. 6A).

Figure 6A:
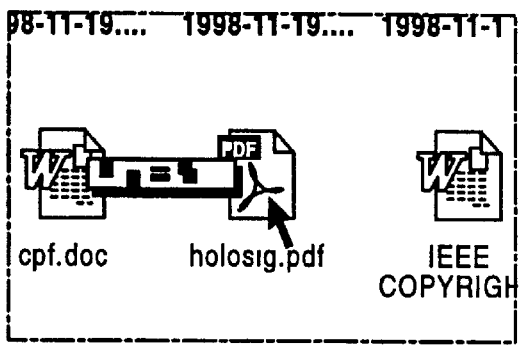
FIGS. 6A, 6B, 6C, and 6D are illustrations of a successive operation process in which, by using a mouse cursor to search a rectangular area for displaying an access history icon, and clicking the desired modification history mark, the file modified at the corresponding date is called.
Figure 6B:
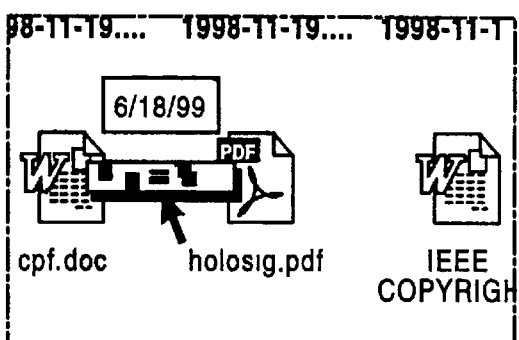

When the mouse cursor is operated in the rectangular display area of the access history icon, data-and-time information corresponding to the position of the cursor is displayed to be pop-up (see FIG. 6B).

Figure 6C:
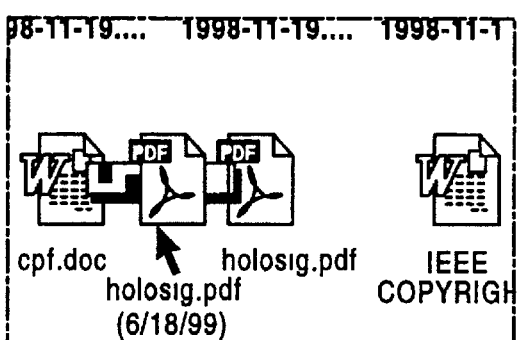
Figure 6D:
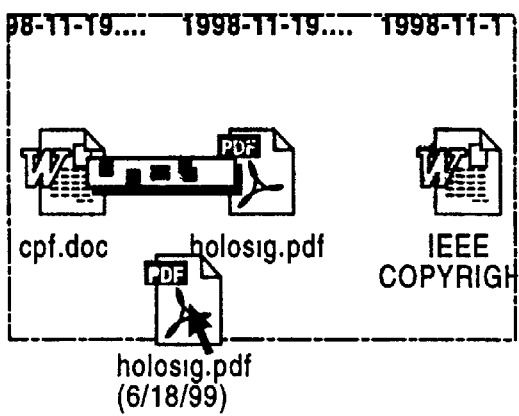

In the rectangular display area of the access history icon, by using the mouse to click a predetermined modification history mark and/or an reference history mark, the file icon is front displayed to be pop-up (see FIG. 6C). It is required that the pup-up file icon be not the present entity of the file but a file entity at a date corresponding to the clicked modification history mark.

By dragging the pop-up file icon with the mouse, the file entity can be extracted as an icon from the desktop (see FIG. 6C).

In the above-described modification, a plurality of file entities exist for a single file name. Thus, the number of files and the size of the files are extremely large, and an excessive load is imposed on the file space. Accordingly, it is preferable to employ a technique such as compression of file size by recording only differences among modified files instead of storing the entirety of the modified file entities.

In the Specification of the invention in Japanese Patent Application No. 11-108535 assigned to the present Assignee, an information processing apparatus and an information processing method are disclosed in which a generated file can be stored so as to be correlated to a lapse of time.

Next, a second embodiment of the present invention is described below in which the present invention is applied to a computer system in distributed computing environments.

Figure 7:
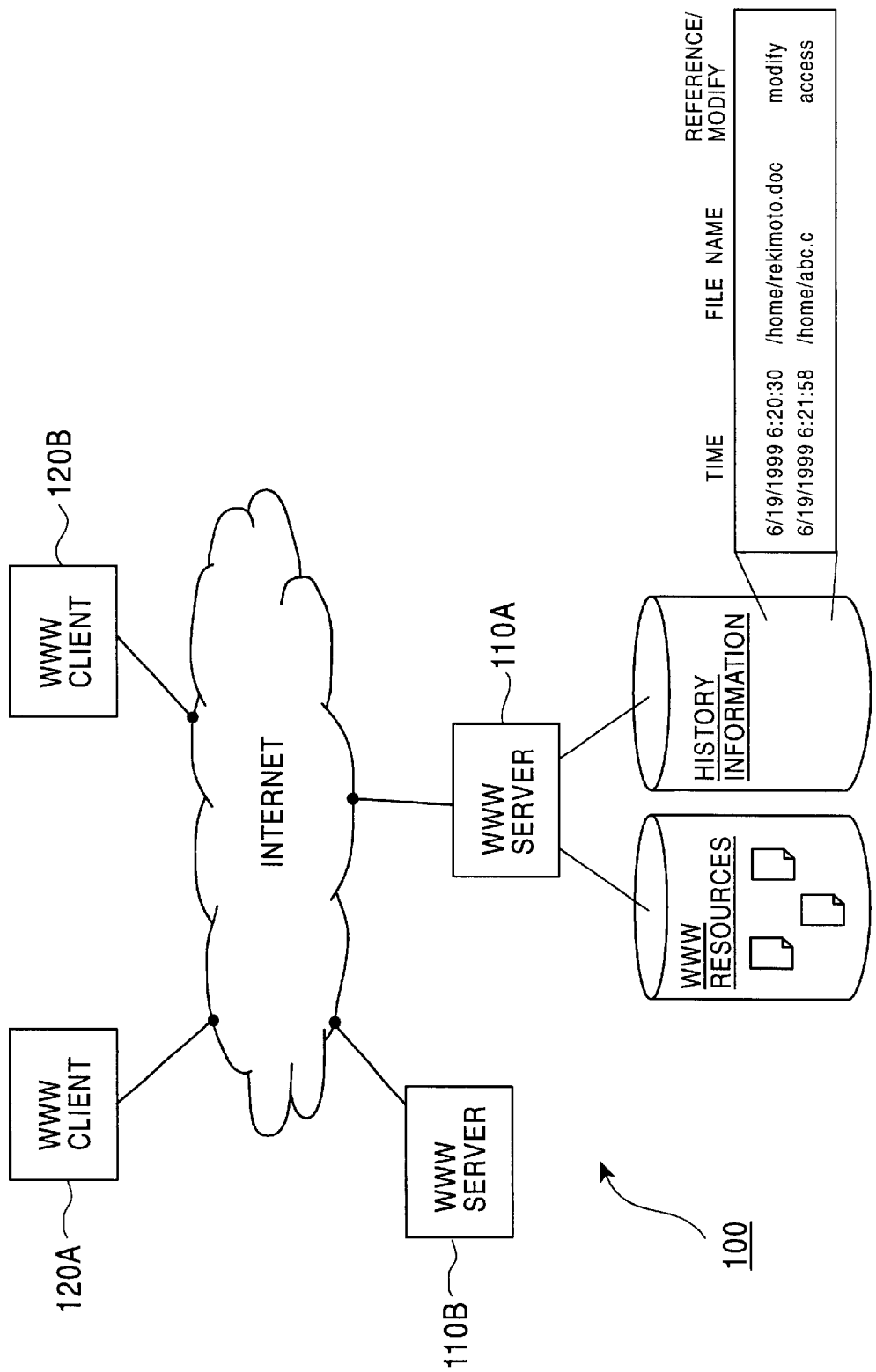
FIG. 7 is a block diagram showing a network computing system 100 in distributed computing environments, which serves for realizing the present invention.

FIG. 7 shows the structure of a network computing system 100 (in the distributed computing environments) according to the present invention. In the second embodiment, on the Internet as a wide-area and open network, a large number of computer systems are connected to one another in accordance with the TCP/IP protocol.

On the Internet, a resource-providing space (called "WWW") for providing information resources is constructed.

The resource objects provided in the WWW resource space are hypertext documents described in the HTML. In other words, the WWW provides a hyperlinked resource space formed by mutual relationships among linked HTML documents. On the Internet, various resource objects including the HTML documents are identified based on a type of address information described in the form of a URL.

Some computers on the Internet operate as WWW servers 110, and offer service of providing HTML documents as resource objects. Some computer on the Internet operate as WWW clients 120 that each request WWW resource objects. In the WWW space, resource accessing is performed in accordance with the HTTP protocol, as is widely known.

Each of the WWW servers 110 is actually a general-purpose computer system that executes sever-use applications. Each of the WWW clients 120 is actually a general-purpose computer system in which a "user agent" (called a "WWW browser") performing resource accessing instead of the user is activated.

A WWW browser is provided with "Location Box" that allows a user of each of the WWW clients 120 to input the character string of a URL with keys for requesting the accessing of the desired WWW page. The WWW browser tries to acquire the requested WWW resource object, that is, an HTML document by accessing a predetermined one of the WWW servers 110 in accordance with the input URL. The WWW browser analyzes the downloaded HTML document and generates a WWW page (also called "home page") screen.

The WWW browser displays a display object such as a character string or an image in which information of link to another WWW resource object is embedded, as an "anchor", in the form of a hot spot. By using only an intuitive operation such as clicking the anchor, the user can issue a request of access to a link destination, thereby freely searching the WWW resource space.

For preferably realizing the present invention, it is preferable that each of the WWW servers 110 have not only a function of owning and providing HTML documents as WWW resource objects, that is, WWW pages, but also a function of recording information on a history of access to each WWW page. The history information includes access times and access attributes (in other words, reference only or modification). In the example shown in FIG. 7, the fact that document "rekimoto.doc" in directory "home" was accessed for writing at 06:20:30 on Jun. 19, 1999, and the fact that file "abc.c" in directory "home" was accessed for reading at 06:21:56 on Jun. 19, 1999, are recorded as the access history information in the file space.

The function of recording a history of access to WWW pages is standard on widely used applications for WWW servers.

Figure 8:
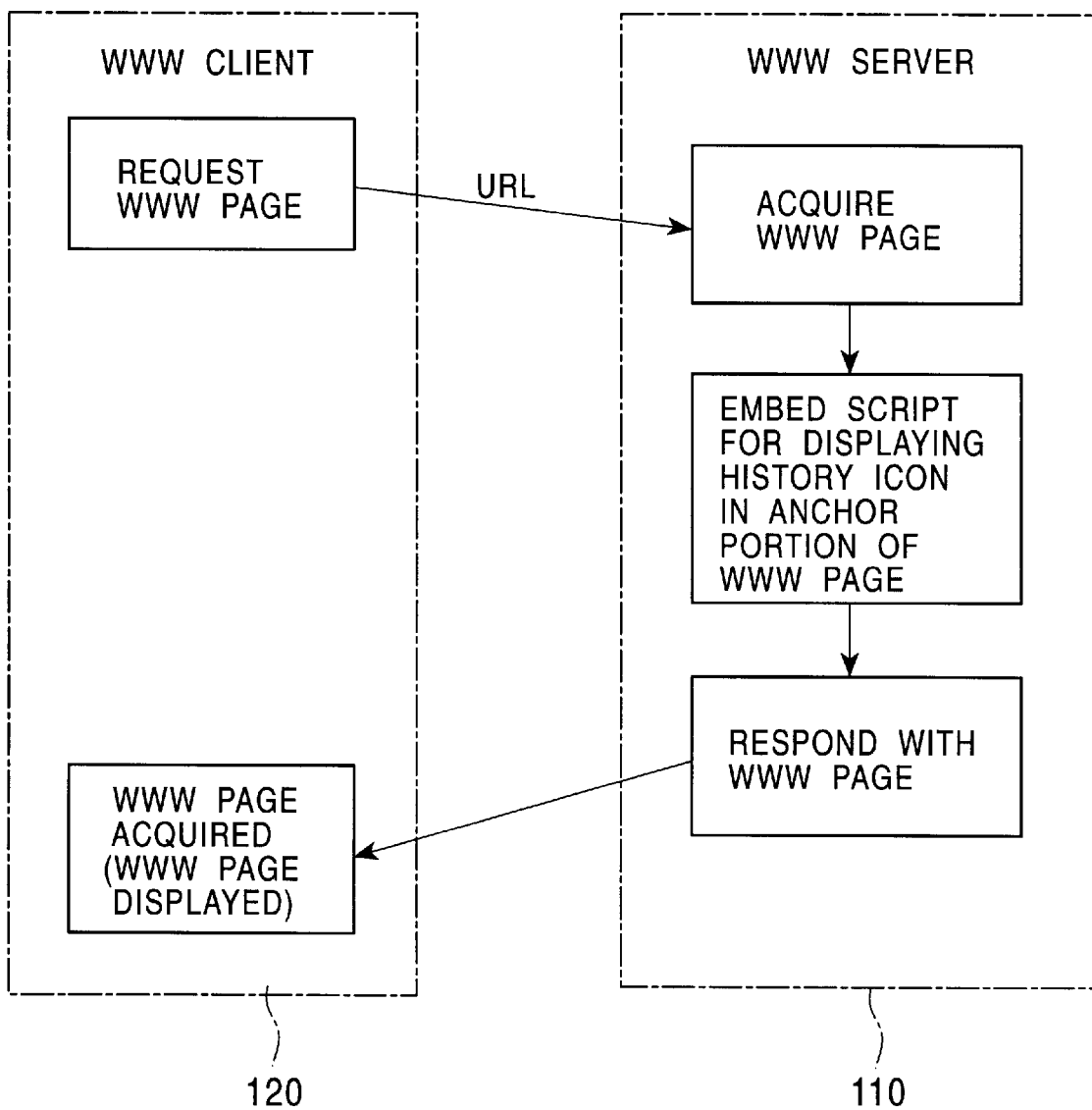
FIG. 8 is an illustration of coordinated operations performed between a WWW client 120 and a WWW server 110 in order that a WWW browser may acquire access-history information on a WWW resource object.

FIG. 8 shows coordinated operations performed between each of the WWW servers 110 and each of the WWW clients 120 in order that the WWW browser may acquire access history information about each access information on WWW pages.

The user of each of the WWW clients 120 requests acquisition of a WWW page by using keys to input a URL in the Location Box on the WWW browser screen, or using the mouse to click the desired anchor in a WWW page displayed on the WWW browser screen.

When the WWW server 110 receives a message of the page request, the WWW server 110 extracts a corresponding resource object, namely, a WWW page, from its local disk in accordance with the description of the URL character string. It is not always required that the corresponding WWW page be owned by the WWW server 110 which receives the page-requesting message. The WWW server 110 may request another WWW server (not shown) to provide WWW pages.

The WWW server 110 searches the above-described history information about its managed WWW pages, and extracts an access history about each link destination which is embedded in the acquired WWW page. The WWW server 110 embeds a script for displaying an access history icon in a portion of HTML source codes constituting the WWW page, which defines the anchor display of each link destination. The script is a text-format description of a process for controlling software to execute steps. The script is commonly used on an application or an OS to automate a series of processes as a combination of operation steps controllable by an end user.

It is preferable for the access history icon to have a representation form which time-sequentially indicates a history of referring to a link destination and which enables the user to grasp histories of reference and modifications to the link destination as time-series change patterns at a glance. For example, the representation form may be an icon image as shown in FIG. 3. In other words, the access history icon is a rectangular image having a horizontal axis as a time base. The upper half of the access history icon from its time base is used to indicate a history of changes in the file, and the lower half is used to indicate a history of referring to the file. The access management module refers to the history information extracted from the file system, and puts a modification history mark at a position corresponding to each time the file is modified and/or an reference history mark at a position corresponding to each time the file is accessed.

The script for displaying the access history icon may be described in a script language such as JavaScript or JScript. A technique in which a script for displaying an icon is automatically generated based on a history information and is embedded in a corresponding portion of HTML source codes is realized using the known art in the computer industry.

The WWW server 110 at the receiving end responds to the WWW client 120, which has sent the request, with the WWW page in which the access-history-icon displaying script is embedded.

The WWW browser of the WWW client 120 analyzes the received WWW page and displays the page on the screen. On the WWW-page displayed screen by the WWW browser, service unique in the present invention, which uses access history icons, can be provided.

Each access-history icon may be displayed so as to be pop-up when the mouse cursor is positioned on each anchor on the WWW-page displayed screen, or may be always displayed for each anchor while the WWW page is being displayed on the screen.

Figures 9A, 9B:
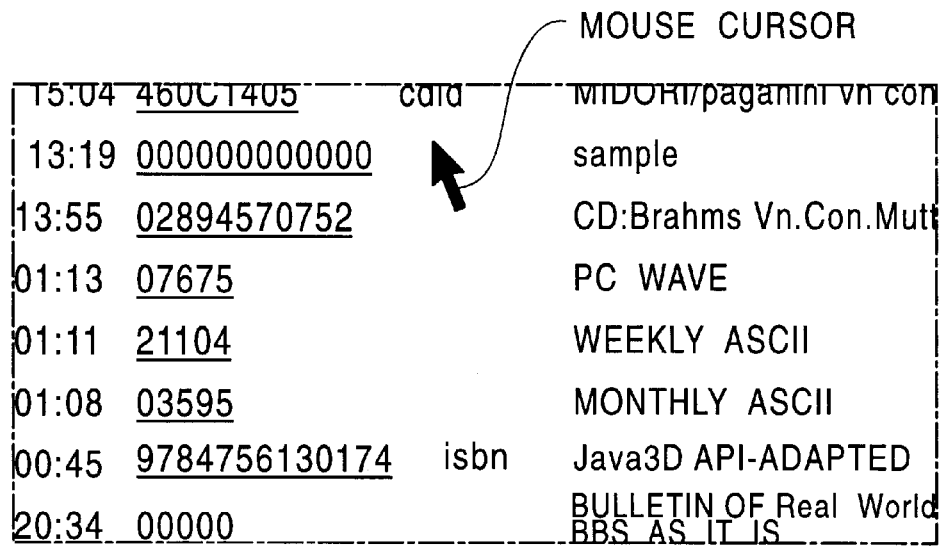
FIGS. 9A and 9B are drawings of an embodiment in which the present invention is applied to a bulletin board system on a WWW, and specifically show that, when a mouse cursor is positioned on a specific anchor, the corresponding access history icon is displayed so as to be pop-up.

FIGS. 9A and 9B show that, when the mouse cursor is positioned on a predetermined anchor, a corresponding access history icon is displayed so as to be pop-up.

The example shown in FIGS. 9A and 9B is an application of the present invention to a bulletin board system (BBS) on the WWW. In the BBS, an anchor is normally assigned to each topic (e.g., this form is employed in one of famous BBSs on the WWW, Yahoo's BBS "message.yahoo.co.jp"). A user can trace a link by selecting an anchor based on the name of a topic.

When the user of the WWW client 120 moves the mouse cursor on the desktop and the mouse cursor enters predetermined topic "000000000000" (see FIG. 9A), the embedded script is activated, whereby an access history icon that represents an access history about the file appears in the vicinity of the file icon (see FIG. 9B).

Figures 10, 11:
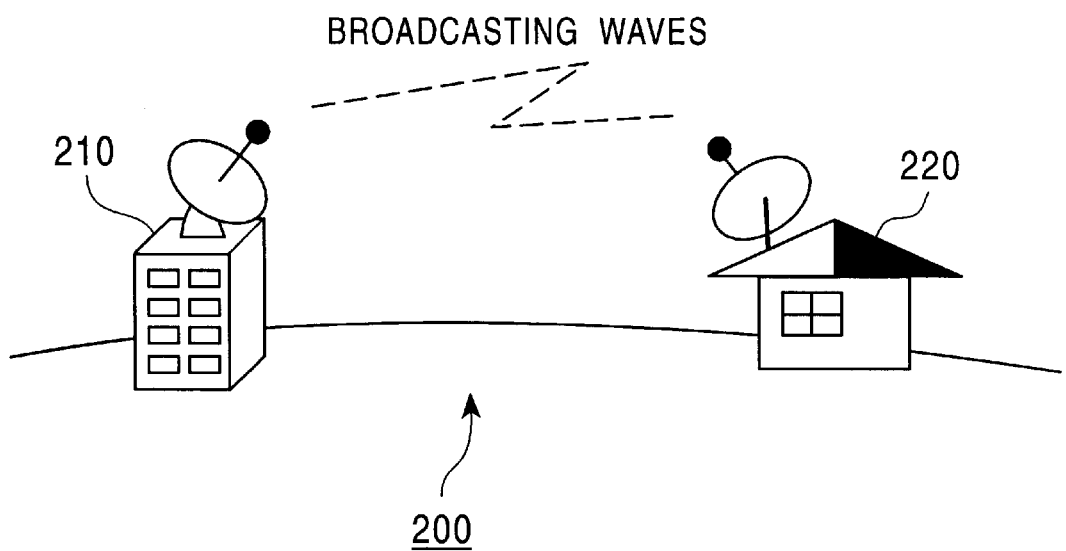
FIG. 10 is a drawing of an embodiment in which the present invention is applied to a bulletin board system on a WWW, and specifically show that, in a period in which a WWW page is displayed on a screen, an access history icon is always displayed for each anchor in the page.
FIG. 11 is an illustration of a television broadcasting system 200 which serves for realizing the present invention.

FIG. 10 shows that, in a period in which a WWW page is displayed on the screen, access history icons are always displayed for anchors in the WWW page. The example shown in FIG. 10 is an application of the present invention to a BBS on the WWW similarly to the example shown in FIGS. 9A and 9B.

It has been difficult to make a search for and a selection of information dependent on trends about many users (participants in discussions) on the WWW, such as "recently controversial information" and "discussions about topics in which many people are recently interested", that is, information dependent on reference histories. Conversely, according to the techniques shown in FIGS. 9A and 9B, and 10, history information is displayed in the vicinity of an anchor corresponding to each topic, whereby a time-series change pattern, for example, at what frequency each topic is referred to and/or updated, can be grasped at a glance.

The method according to the second embodiment may be applied to other types of services provided in the WWW resource space. For example, also when the user needs to reach a product-related WWW page from a WWW page about company information, popular goods and their freshness can be visually recognized using displayed access history icons as keys.

According to the second embodiment, the user of the WWW client 120 can not only visually recognize reference information represented by an anchor on the WWW browser screen, but also intuitively and precisely grasp, at a glance, an access history and a modification history about a WWW page as a link destination represented by the anchor. For example, by visually and instantly obtaining a history of updating, such as the information that "this WWW page is updated every three hours", the obtained information can be used as an effective key for searching the WWW resource space (i.e., "net surfing")

Next, a third embodiment of the present invention in which the present invention is applied to a television program in accordance with a digital data broadcasting method is described below.

FIG. 11 shows the schematic structure of a television broadcasting system 200 which serves for realizing the present invention.

The television broadcasting system 200 includes at least one broadcast server 210 (for providing broadcasting service) and receiver/decoders 220 (for receiving broadcast contents). The number of the receiver/decoders 220 corresponds to the number of ordinary homes and is actually uncountable. In FIG. 11, for brevity of drawing, one broadcast server 210 and one receiver/decoder 220 are only shown. In realizing the present invention, broadcasting waves may be either type of terrestrial waves and satellite waves. The form of distribution may be not only not a method by radio but also a method by wire.

Digital data for data broadcasting are multiplexed with real-time video and audio information (hereinafter referred to as "real-time audio-visual (AV) data") constituting the main part of a broadcasting program, and the multiplex signals are distributed as broadcasting waves in accordance with a predetermined format from the broadcast server 210.

At each receiver/decoder 220, the received broadcasting waves are processed for selection, and are digital-modulated. The modulated waves are separated into real-time AV data and data-broadcasting data. From the real-time AV data, pictures and sounds constituting the main part of the original broadcasting program are reproduced. The data-broadcasting data are computer-processed to generate data for displaying data broadcasting.

On the television screen, the picture constituting the main part of the broadcasting program and display data generated by the data broadcasting are displayed so as to be superimposed on each other.

The data for data broadcasting includes not only a function of an electronic program guide (information indicating a broadcasting schedule and program names) but also a VCR-recording reservation function.

In the third embodiment, rating data obtained for each program is used as one of the contents of the data-broadcasting data. As a result, on the television screen, in addition to the main part of the displayed program, a plurality of programs (channels) are displayed in the form of icons. Each icon indicates a change pattern in the program rating during a predetermined period in the past (see FIG. 3).

Concerning the rating of each program, the broadcast server 210 independently sets a number of rating monitors, and uses the results of detection from the monitors. Also, program-rating data, obtained from an external program rating search company, may be utilized. The rating of each broadcast program is a value representing the number of times the resource object as a broadcasting content is accessed, or an access frequency. The program rating is varying time-series data as its property.

Figure 12:
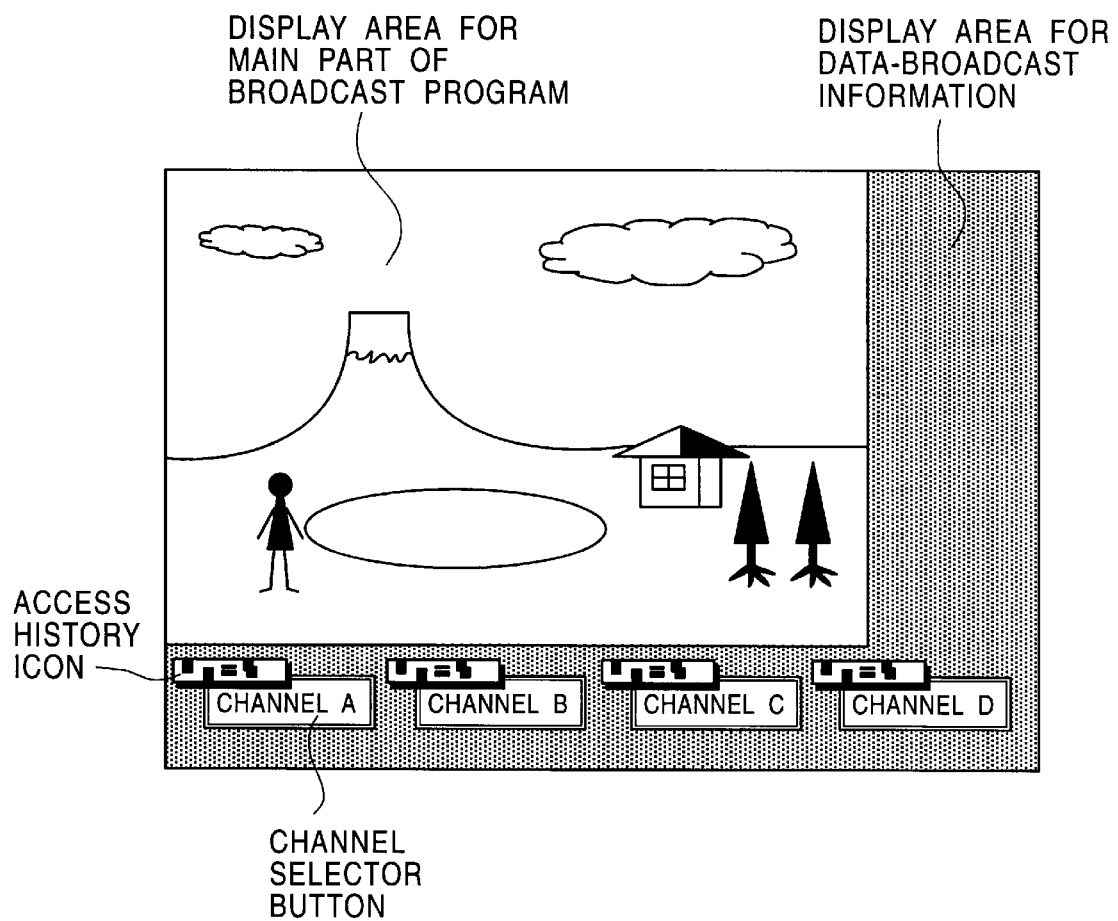
FIG. 12 is an illustration of a received picture of a data-broadcasting television program according to the present invention.

FIG. 12 shows a television picture displayed by receiving the data broadcasting. As shown in FIG. 12, the television picture is divided into a display area for the main part of the broadcast program and a display area for data-broadcast information. In the display area for data-broadcast information, a plurality of channel selector buttons. On part of each button, the corresponding access history icon is also displayed which represents a program-rating change pattern of a program broadcast on the channel during a predetermine period in the past.

Viewers can visually recognize the most popular program among a list of the present programs being broadcast, and can easily select the channel.

In Japan, digital satellite broadcasting is in the process of being standardized under the leadership of (Japanese) Association of Radio Industries and Businesses (ARIB). The data-broadcasting data can be described in a markup description language such as the Extensible Markup Language (XML), the employment of which is discussed in the standardizing process.

The present invention has been described with reference to specific embodiments thereof. However, it is obvious that those skilled in the art can modify the embodiments or can make a substitute for the embodiments within the scope of the present invention. In other words, the present invention has been disclosed in terms of preferred embodiments, and should not be limitedly interpreted. For understanding the scope of the present invention, the following claims should be considered.

What is claimed is:

1. An access-history indicating method for indicating a history of access to a resource object on a computer screen, comprising the steps of:

(a) sequentially recording the history of access to said resource object, wherein a plurality of access records are created for said resource object;

(b) generating an access history icon time-sequentially representing the history of access to said resource object; and (c) displaying, on said computer screen, the generated history information so as to be correlated with the icon of said resource object.

2. An access-history indicating method according to claim 1, wherein the access history icon consists of a time base and a mark representing each record of access which is disposed at the corresponding position on said time base.

3. An access-history indicating method according to claim 1, wherein the access history icon is formed by determining whether each record of access to said resource object represents a reference to said resource object or modification of said resource object, and disposing a reference history mark and/or a modification history mark at each corresponding position on a time base.

4. An access-history indicating method according to claim 3, further comprising the step of executing, when one modification history mark in the access history icon is selected by a user, provision of a resource object entity corresponding to the selected modification history mark.

5. An access-history indicating method according to claim 1, wherein at least one of the steps (b) and (c) is activated when a representation of a user's interest enters an area for displaying the icon of one resource object displayed on said computer screen.

6. An access-history indicating method according to claim 5, wherein said user's interest is measured in accordance with the position of a displayed cursor movable on said computer screen by operating a mouse.

7. An access-history indicating method according to claim 1, wherein at least one of the steps (b) and (c) is activated when the icon of said resource object is displayed on said computer screen.

8. An access-history indicating method according to claim 1, wherein said resource object is a file in a predetermined format processable in a computer.

9. An access-history indicating apparatus for indicating a history of access to a resource object on a computer screen, comprising:

(a) means for sequentially recording the history of access to said resource object, wherein a plurality of access records are created for said resource object;

(b) means for generating an access history icon time-sequentially representing the history of access to said resource object; and (c) means for displaying, on said computer screen, the generated history information so as to be correlated with the icon of said resource object.

10. An access-history indicating apparatus according to claim 9, wherein the access history icon consists of a time base and a mark representing each record of access which is disposed at the corresponding position on said time base.

11. An access-history indicating apparatus according to claim 9, wherein the access history icon is formed by determining whether each record of access to said resource object represents a reference to said resource object or modification of said resource object, and disposing a reference history mark and/or a modification history mark at each corresponding position on a time base.

12. An access-history indicating apparatus according to claim 11, further comprising a means for executing, when one modification history mark in the access history icon is selected by a user, provision of a resource object entity corresponding to the selected modification history mark.

13. An access-history indicating apparatus according to claim 9, wherein at least one of said means (b) and (c) is activated when a representation of a user's interest enters an area for displaying the icon of one resource object displayed on said computer screen.

14. An access-history indicating apparatus according to claim 13, wherein said user's interest is measured in accordance with the position of a displayed cursor movable on said computer screen by operating a mouse.

15. An access-history indicating apparatus according to claim 9, wherein at least one of said means (b) and (c) is activated when the icon of said resource object is displayed on said computer screen.

16. An access-history indicating apparatus according to claim 9, wherein said resource object is a file in a predetermined format processable in a computer.

17. A resource providing method for providing a resource object including reference information for referring to another resource object, comprising the steps of:

(a) sequentially recording a history of access to said resource object;

(b) generating a command for displaying an access history icon time-sequentially representing the history of access to said resource object, wherein a plurality of access records are created for said resource object; and (c) adding the command generated in the step (b) to said reference information.

18. A resource providing method according to claim 17, wherein the access history icon consists of a time base and a mark representing each record of access which is disposed at the corresponding position on said time base.

19. A resource providing method according to claim 17, wherein the access history icon is formed by determining whether each record of access to said resource object represents a reference to said resource object or modification of said resource object, and disposing a reference history mark and/or a modification history mark at each corresponding position on a time base.

20. A resource providing method according to claim 17, wherein the command generated in the step (b) prescribes that, when a user's interest enters a piece of reference information on a computer screen displaying resource objects, an access history icon corresponding to a resource object to be referred to by said piece of reference information is displayed.

21. A resource providing method according to claim 17, wherein the command generated in the step (b) prescribes that, when said reference information is displayed on a computer screen, an access history icon corresponding to a resource object to be referred to by said piece of reference information is displayed.

22. A resource providing method according to claim 17, wherein at least one of the steps (b) and (c) is activated when provision of said resource object is requested.

23. A resource providing method according to claim 17, wherein:

each of the resource objects is a document file described in a markup description language; and the command generated in the step (b) is a script described in a script language.

24. A resource providing apparatus for providing a resource object including information for referring to another resource object, comprising:

recording means for sequentially recording a history of access to said resource object;

generating means for generating a command for displaying an access history icon time-sequentially representing the history of access to said resource object, wherein a plurality of access records are created for said resource object; and adding means for adding the command generated by said generating means to said reference information.

25. A resource providing apparatus according to claim 24, wherein the access history icon consists of a time base and a mark representing each record of access which is disposed at the corresponding position on said time base.

26. A resource providing apparatus according to claim 24, wherein the access history icon is formed by determining whether each record of access to said resource object represents a reference to said resource object or modification of said resource object, and disposing a reference history mark and/or a modification history mark at each corresponding position on a time base.

27. A resource providing apparatus according to claim 24, wherein the command generated by said generating means prescribes that, when a user's interest enters a piece of reference information on a computer screen displaying resource objects, an access history icon corresponding to a resource object to be referred to by said piece of reference information is displayed.

28. A resource providing apparatus according to claim 24, wherein the command generated by said generating means prescribes that, when said reference information is displayed on a computer screen, an access history icon corresponding to a resource object to be referred to by said piece of reference information is displayed.

29. A resource providing apparatus according to claim 24, wherein at least one of said generating means and said adding means is activated when provision of said resource object is requested.

30. A resource providing apparatus according to claim 24, wherein:

each of the resource objects is a document file described in a markup description language; and the command generated by said generating means is a script described in a script language.

31. A program providing medium for providing, in a material and computer-readable form, a computer program for controlling a computer to execute a process for indicating a history of access to a resource object on a computer screen, said computer program comprising the steps of:

(a) sequentially recording the history of access to said resource object, wherein a plurality of access records are created for said resource object;

(b) generating a command for displaying an access history icon time-sequentially representing the history of access to said resource object; and (c) displaying the generated access history icon on said computer screen so as to be correlated with the icon of said resource object.

32. A program providing medium for providing, in a material and computer-readable form, a computer program for controlling a computer to execute a resource providing process for providing a resource object including reference information for referring to another resource object, said computer program comprising the steps of:

(a) sequentially recording the history of access to said resource object, wherein a plurality of access records are created for said resource object;

(b) generating a command for displaying an access history icon time-sequentially representing the history of access to said resource object; and (c) adding the command generated in the step (b) to said reference information.

* * * * *